UNITED STATES PATENT OFFICE.

JOHN LOUIS BACH, OF BUFFALO, NEW YORK.

COMPOSITION FOR CLEANING METALS.

SPECIFICATION forming part of Letters Patent No. 665,864, dated January 15, 1901.

Application filed October 19, 1900. Serial No. 33,643. (No specimens.)

*To all whom it may concern:*

Be it known that I, JOHN LOUIS BACH, a citizen of the United States, residing at Buffalo, in the county of Erie and State of New York, have invented a new and useful Composition of Matter to be Used for the Removal of Grease or other Impurities from such Metals as Steel, Iron, Copper, Brass, Zinc, &c., of which the following is a specification.

My composition consists of the following ingredients, combined in the proportions stated, viz: potassium carbonate, one ounce; potassium cyanid, one-half ounce; sodium carbonate, one-half ounce; chlorid of sodium, one-tenth ounce; water, substantially pure, one gallon.

All the ingredients in the above composition may be dissolved together in warm water. The solution should be used at a boiling-point. To operate with this solution, a strong electric current is employed. The object to be freed from grease or other impurities is immersed by iron wire in the above solution and connected to the positive pole. A formation of gas takes place which immediately separates all grease or other impurities from the object and renders it chemically clean.

I am not aware that a composition consisting of potassium carbonate, potassium cyanid, sodium carbonate, and chlorid of sodium has ever been used for the same purpose in the manner above described or that a patent therefor was granted.

What I claim, and desire to secure by Letters Patent of the United States, is—

1. The herein-described composition of matter—water, potassium carbonate, potassium cyanid, sodium carbonate, and chlorid of sodium—substantially as described and for the purpose and in the manner specified.

2. The herein-described composition of matter for cleaning metals consisting of pure water, one gallon; potassium carbonate, one ounce; potassium cyanid, one-half ounce; sodium carbonate, one-half ounce; chlorid of sodium, one-tenth ounce; substantially as described.

In testimony whereof I have signed my name to this specification in the presence of two subscribing witnesses.

JOHN LOUIS BACH.

Witnesses:
MASON B. HATCH,
ROBERT MODERWELL.